United States Patent
Takahashi

(10) Patent No.: US 9,921,534 B2
(45) Date of Patent: Mar. 20, 2018

(54) IMAGE FORMING APPARATUS

(71) Applicant: KYOCERA Document Solutions Inc., Osaka-shi, Osaka (JP)

(72) Inventor: Tomohiro Takahashi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/633,432

(22) Filed: Jun. 26, 2017

(65) Prior Publication Data

US 2017/0371286 A1  Dec. 28, 2017

(30) Foreign Application Priority Data

Jun. 27, 2016  (JP) .................................. 2016-126522

(51) Int. Cl.
*G03G 15/00* (2006.01)
*G03G 15/08* (2006.01)
(Continued)

(52) U.S. Cl.
CPC ......... *G03G 15/5041* (2013.01); *G03G 15/04* (2013.01); *G03G 15/553* (2013.01);
(Continued)

(58) Field of Classification Search
CPC .... G03G 15/55; G03G 15/553; G03G 15/556; G03G 15/5041; G03G 15/5008; G03G 15/0831; G03G 15/04; G03G 15/043; G03G 21/10; G03G 21/12; G03G 21/16; G03G 2215/0888; G03G 2221/1823;
(Continued)

(56) References Cited

U.S. PATENT DOCUMENTS

2006/0098223 A1* 5/2006 Yoshizuka ......... G03G 15/0803
358/1.15
2010/0080600 A1* 4/2010 Okamoto ............... G03G 21/12
399/71
(Continued)

FOREIGN PATENT DOCUMENTS

JP       2010243911 A      10/2010

*Primary Examiner* — Sophia S Chen
(74) *Attorney, Agent, or Firm* — Alleman Hall Creasman & Tuttle LLP

(57) ABSTRACT

An image forming apparatus includes a replenishment empty history recording portion, a post-empty attachment detecting portion, and an image creation restricting portion. The replenishment empty history recording portion records replenishment empty history information to a storage device in correspondence with one of the plurality of developer containers in which a replenishment empty state was detected in a first attachment portion. The post-empty attachment detecting portion detects whether or not a second attachment portion is in a post-empty container attached state where the developer container corresponding to the replenishment empty history information recorded in the storage device is attached to the second attachment portion. The image creation restricting portion, upon detection of the replenishment empty state, restricts an operation of an image creating device, and upon detection that the second attachment portion is in the post-empty container attached state, releases a restriction on the operation of the image creating device.

10 Claims, 9 Drawing Sheets

(51) Int. Cl.
   *H04N 1/036* (2006.01)
   *G03G 15/04* (2006.01)
   G03G 15/043 (2006.01)
   G06K 15/12 (2006.01)

(52) U.S. Cl.
   CPC ........... *H04N 1/036* (2013.01); *G03G 15/043* (2013.01); *G03G 2221/1892* (2013.01); *G06K 15/12* (2013.01)

(58) Field of Classification Search
   CPC ..... G03G 2221/183; G03G 2221/1892; H04N 1/036; G06K 15/12
   See application file for complete search history.

(56) References Cited

U.S. PATENT DOCUMENTS

| | | | | |
|---|---|---|---|---|
| 2010/0303482 A1* | 12/2010 | Fujisawa | ............... | G03G 15/553 399/27 |
| 2011/0026948 A1* | 2/2011 | Nagasu | ................ | G03G 15/553 399/35 |
| 2015/0104200 A1* | 4/2015 | Matsumoto | .......... | G03G 15/556 399/12 |

* cited by examiner

IMAGE FORMING APPARATUS

INCORPORATION BY REFERENCE

This application is based upon and claims the benefit of priority from the corresponding Japanese Patent Application No. 2016-126522 filed on Jun. 27, 2016, the entire contents of which are incorporated herein by reference.

BACKGROUND

The present disclosure relates to an image forming apparatus.

In general, an electrophotographic image forming apparatus includes an image creating device. The image creating device includes a developing device and an image carrying member that carries an image of powdery developer that is supplied from the developing device. Furthermore, the image forming apparatus includes a developer replenishment container and a developer collection container, wherein the developer replenishment container stores developer to be replenished to the developing device, and the developer collection container stores waste developer collected from the image creating device.

The image forming apparatus, upon detecting an empty state of the developer replenishment container, outputs a notification to urge replacement of the developer replenishment container. Furthermore, the image forming apparatus, upon detecting a full state of the developer collection container, outputs a notification to urge replacement of the developer collection container, and restricts the operation of the image creating device until the full developer collection container is replaced with an empty container.

For example, there is known an image forming apparatus that determines a timing of replacing the developer collection container based on the number of developer replenishment containers that have been replaced with new ones.

SUMMARY

An image forming apparatus according to an aspect of the present disclosure includes an image creating device, a plurality of developer containers, at least one first attachment portion, a second attachment portion, a display device, a replenishment empty detection sensor, and a processor. The processor executes a replenishment empty history recording portion, a post-empty attachment detecting portion, a container replacement notifying portion, and an image creation restricting portion. The image creating device includes a developing device and an image carrying member that carries an image of developer that is supplied from the developing device. The plurality of developer containers respectively store the developer. The first attachment portion constitutes a part of the image forming apparatus, and some of the plurality of developer containers that replenish the developer to the developing device, are attached to the first attachment portion in a detachable manner. The second attachment portion constitutes a part of the image forming apparatus, and the others of the plurality of developer containers that are to store the developer collected from the image creating device, are attached to the second attachment portion in a detachable manner. The replenishment empty detection sensor detects whether or not any of the developer containers attached to the first attachment portion is in a replenishment empty state where a residual amount of the developer therein is smaller than a predetermined lower limit amount. The replenishment empty history recording portion, upon detection of the replenishment empty state, records replenishment empty history information to a computer-readable nonvolatile history storage device in correspondence with one of the plurality of developer containers in which the replenishment empty state was detected. The post-empty attachment detecting portion, upon detection of the replenishment empty state, detects whether or not the second attachment portion is in a post-empty container attached state where the developer container corresponding to the replenishment empty history information recorded in the history storage device is attached to the second attachment portion. The container replacement notifying portion, upon detection of the replenishment empty state, outputs, via the display device, a notification urging to replace the developer container attached to the second attachment portion. The image creation restricting portion, upon detection of the replenishment empty state, restricts an operation of the image creating device, and upon detection that the second attachment portion is in the post-empty container attached state, releases a restriction on the operation of the image creating device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
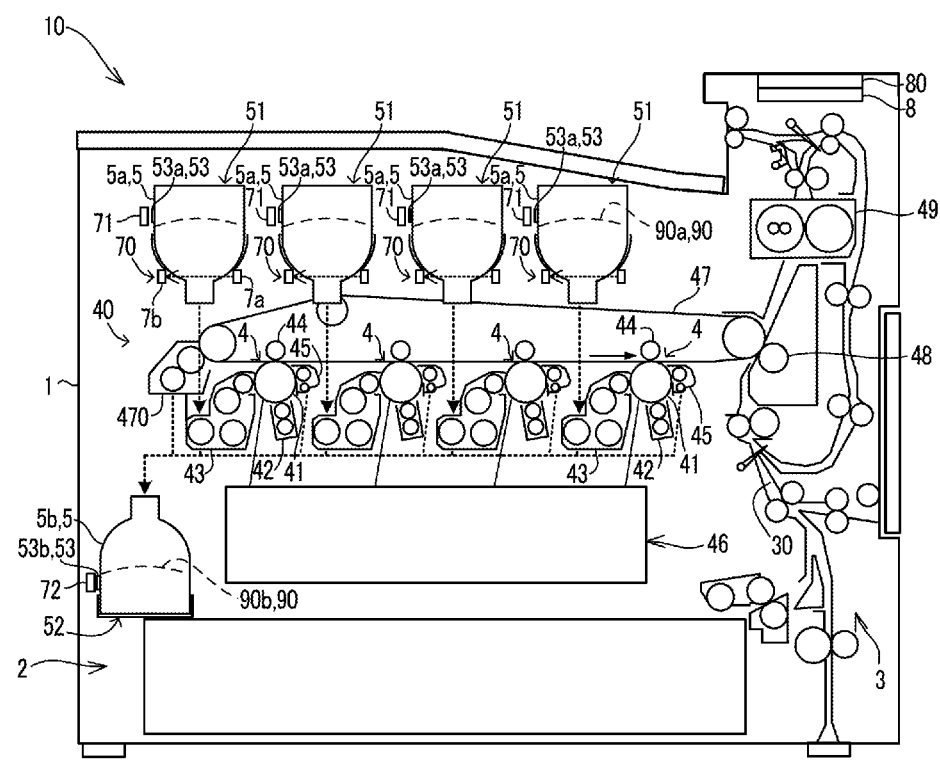
FIG. 1 is a configuration diagram of an image forming apparatus according to a first embodiment of the present disclosure.

The following describes embodiments of the present disclosure with reference to the accompanying drawings. It should be noted that the following embodiments are examples of specific embodiments of the present disclosure and should not limit the technical scope of the present disclosure.

First Embodiment

First, a description is given of a configuration of an image forming apparatus 10 according to a first embodiment of the present disclosure. The image forming apparatus 10 performs an image forming process of forming an image on a sheet by an electrophotographic system. The sheet is a sheet-like image formation medium such as a sheet of paper, an envelope, or an OHP sheet.

The image forming apparatus 10 includes, in a main body 1, a sheet supply device 2, a sheet conveying device 3, an image creating device 40, a laser scanning unit 46, a fixing device 49, and a control device 8. The image creating device 40 includes a plurality of developing units 4 and equipment regarding conveyance of developer 90.

Each of the developing units 4 includes a photoconductor 41, a charging device 42, a developing device 43, a primary transfer device 44, and a primary cleaning device 45.

The image forming apparatus 10 shown in FIG. 1 is a tandem image forming apparatus and is a color printer. As a result, the image forming apparatus 10 includes the plurality of developing units 4 that respectively correspond to colors of cyan, magenta, yellow and black, as well as an intermediate transfer belt 47, a secondary transfer device 48 and a secondary cleaning device 470.

The sheet supply device 2 feeds the sheet to a conveyance path 30. The sheet conveying device 3 conveys, along the conveyance path 30, the sheet supplied from the sheet supply device 2.

In each of the developing units 4, the drum-like photoconductor 41 rotates, and the charging device 42 charges the surface of the photoconductor 41 uniformly. The laser scanning unit 46 writes an electrostatic latent image on the surface of the photoconductor 41 by scanning the surface of the photoconductor 41 with a laser beam. The developing device 43 develops the electrostatic latent image on the surface of the photoconductor 41 with powdery developer 90. With this operation, an image of the developer 90 is formed on the surface of the photoconductor 41.

In the present embodiment, the developing device 43 executes a developing process by using the two-component developer 90 composed of toner and carrier. The developing device 43 supplies the toner to the surface of the photoconductor 41 from a magnet roller that carries the toner and the carrier.

The developing device 43 may be an interactive-touchdown type device, for example. In this case, the developing device 43 moves the toner from the magnet roller to the developing roller, and supplies the toner from the developing roller to the photoconductor 41. In addition, the developing device 43 may be of a type that directly supplies the toner from the magnet roller to the photoconductor 41.

The primary transfer device 44 transfers the image of the developer 90 from the surface of the photoconductor 41 to the intermediate transfer belt 47. As a result, images of the developer 90 are transferred from the plurality of photoconductors 41 to the intermediate transfer belt 47. This allows the images of the developer 90 of different colors to be formed as a color image on the intermediate transfer belt 47. The primary cleaning device 45 removes residual developer 90 from the surface of the photoconductor 41.

The secondary transfer device 48 transfers the image of the developer 90 transferred to the intermediate transfer belt 47, to the sheet that is moving in the conveyance path 30. The secondary cleaning device 470 removes residual developer 90 from the intermediate transfer belt 47. The fixing device 49 fixes the image of the developer 90 transferred to the sheet, to the sheet by heating the image.

As described above, the image creating device 40 executes a developing process of forming an image of the developer 90 on the photoconductor 41 and the intermediate transfer belt 47, and a developer conveying process of conveying the developer 90.

The image forming apparatus 10 further includes a plurality of developer containers 5 that can store the developer 90. Some of the plurality of developer containers 5 are attached to first attachment portions 51 of the main body 1 in a detachable manner. The others are attached to a second attachment portion 52 of the main body 1 in a detachable manner.

The developer 90 is replenished from the developer containers 5 attached to the first attachment portions 51, to the developing device 43. That is, the developer containers 5 that replenish the developer 90 to the developing device 43, are attached to the first attachment portions 51.

The main body 1 is provided with a plurality of first attachment portions 51 in correspondence with a plurality of developing units 4. As a result, the plurality of first attachment portions 51 storing developer 90 of different colors are respectively attached to the plurality of first attachment portions 51.

The developer 90 removed from the photoconductor 41 and the intermediate transfer belt 47 by the primary cleaning device 45 and the secondary cleaning device 470 is collected in a developer container 5 attached to the second attachment portion 52. Furthermore, a part of the developer 90 that has been deteriorated in the developing device 43 is collected in the developer container 5 attached to the second attachment portion 52. It is noted that the second attachment portion 52 is provided only at one place in the main body 1.

That is, the developer container 5 that is to store the developer 90 collected from the image creating device 40, is attached to the second attachment portion 52. In the present embodiment, the plurality of developing units 4, the intermediate transfer belt 47, the secondary transfer device 48, and the secondary cleaning device 470 respectively form a part of the image creating device 40. It is noted that the photoconductor 41 and the intermediate transfer belt 47 are examples of the image carrying member that carries an image of the developer 90.

In the following description, the developer containers 5 attached to the first attachment portions 51 are referred to as developer replenishment containers 5a. In addition, the developer 90 stored in the developer replenishment containers 5a is referred to as replenishment developer 90a. Normally, the replenishment developer 90a contains the toner, not containing the carrier.

On the other hand, the developer containers 5 attached to the second attachment portion 52 is referred to as a developer collection container 5b. In addition, the developer 90 collected in the developer collection container 5b is referred to as waste developer 90b. Normally, the developer 90 collected from the photoconductor 41 and the intermediate transfer belt 47 is the toner. In addition, the developer 90 collected from the developing device 43 contains the toner and the carrier. Accordingly, the waste developer 90b contains both the toner and the carrier.

The image forming apparatus 10 further includes the control device 8 and an operation/display device 80. The control device 8 controls the electric equipment of the image forming apparatus 10. The operation/display device 80 is a user interface including an operation device 80a and a display device 80b. The operation device 80a includes a touch panel and operation buttons to receive user operations. In addition, the display device 80b includes a display panel such as a liquid crystal display panel that can display a message.

In the image forming apparatus 10, the plurality of developer containers 5 that are attached to the plurality of first attachment portions 51 and the second attachment portion 52 all have the same shape. That is, it is possible to use one type of developer container 5 in common as the developer replenishment containers 5a and the developer collection container 5b.

Meanwhile, using one type of developer container 5 in common as the developer replenishment containers 5a and the developer collection container 5b as described above reduces the manufacturing cost of the developer container 5. However, if a developer container 5 used as a developer replenishment container 5a is used as a developer collection container 5b in a state where much replenishment developer 90a remains, the unused replenishment developer 90a is wasted.

In addition, in the image forming apparatus 10, it is desirable to output a notification that urges a replacement of the developer collection container 5b without a sensor for detecting the amount of the waste developer 90b in the developer collection container 5b. This makes it possible to prevent a delay of notification that is caused by an erroneous detection by the sensor of the amount of the waste developer 90b whose properties are largely varied, and reduce the cost of the apparatus.

[Configuration of Control Device Related Portion]

The control device 8 of the image forming apparatus 10 executes a developer container replacement control that is described below. With this configuration, it is possible to prevent the replenishment developer 90a in the developer replenishment containers 5a from being wasted, without a sensor for detecting the amount of the waste developer 90b in the developer collection container 5b, and urge the user at an appropriate timing to replace the developer collection container 5b.

Figure 2:
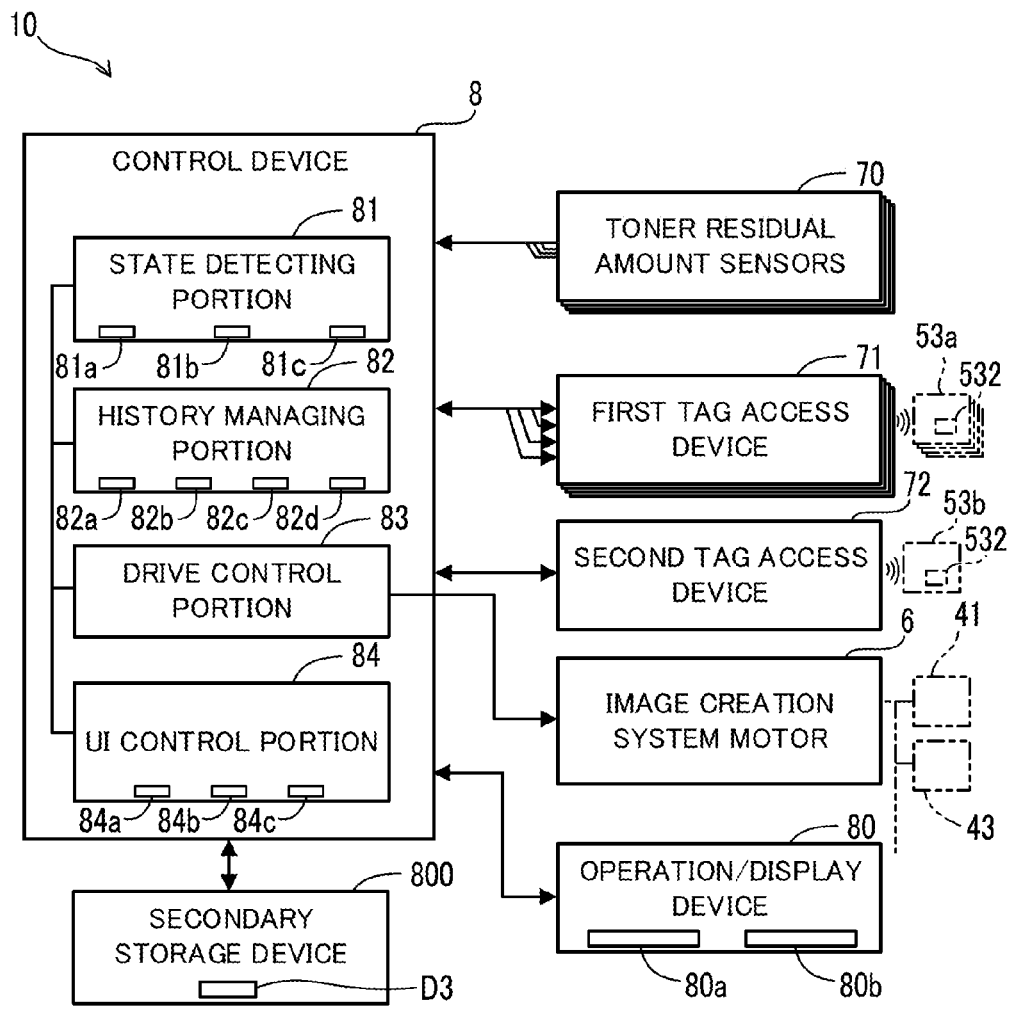
FIG. 2 is a block diagram of control-related portions in the image forming apparatus according to the first embodiment.

As shown in FIG. 1 and FIG. 2, the image forming apparatus 10 includes toner residual amount sensors 70 respectively provided in the first attachment portions 51. Each of the toner residual amount sensors 70 detects whether or not a corresponding developer replenishment container 5a is in a replenishment empty state where the residual amount of the replenishment developer 90a therein is smaller than a predetermined lower limit amount. It is noted that the toner residual amount sensors 70 are an example of the replenishment empty detection sensor.

Each of the toner residual amount sensors 70 may be a transmission type optical sensor. The transmission type optical sensor includes a light emission portion 7a and a light reception portion 7b that are arranged to face each other. The light emission portion 7a and the light reception portion 7b are arranged at predetermined positions close to a lower end of a developer replenishment container 5a.

A portion of the developer replenishment container 5a between the light emission portion 7a and the light reception portion 7b is transparent. A state where the toner residual amount sensor 70 detects no replenishment developer 90a in the portion between the light emission portion 7a and the light reception portion 7b is referred to as the replenishment empty state.

The toner residual amount sensor 70 may be a sensor configured to detect whether or not the weight of the developer replenishment container 5a is smaller than a predetermined lower limit weight. In this case, each of the first attachment portions 51 includes a displacement mechanism that is displaced in response to a change in the weight of the developer replenishment container 5a, and the toner residual amount sensor 70 detects whether or not the displacement mechanism has been displaced and exceeded a predetermined upper limit.

An electronic tag 53 is fixed to each of the developer containers 5. The electronic tag 53 is, for example, a RF (Radio Frequency) tag.

Figure 3:
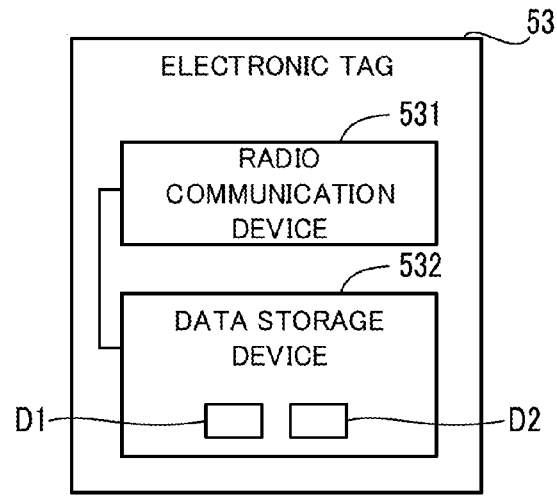
FIG. 3 is a block diagram of an electronic tag in the image forming apparatus according to the first embodiment.

As shown in FIG. 3, the electronic tag 53 includes a radio communication device 531 and a data storage device 532, wherein the radio communication device 531 performs a short range wireless communication, and the data storage device 532 is a computer-readable nonvolatile data storage device.

In the following description, the electronic tag 53 of the developer replenishment containers 5a is referred to as a replenishment container tag 53a, and the electronic tag 53 of the developer collection container 5b is referred to as a collection container tag 53b.

Furthermore, the image forming apparatus 10 includes first tag access devices 71 and a second tag access device 72, wherein the first tag access devices 71 are respectively provided in the first attachment portions 51, and the second tag access device 72 is provided in the second attachment portion 52.

Each of the first tag access devices 71 is configured to execute an access process of accessing the data storage device 532 of the replenishment container tag 53a. The second tag access device 72 is configured to execute an access process of accessing the data storage device 532 of the collection container tag 53b.

The access process includes a read process and a write process, wherein in the read process, data is read from the data storage device 532, and in the write process, data is written to the data storage device 532 of the replenishment container tag 53a. In general, the first tag access devices 71 and the second tag access device 72 are each called a tag reader/writer.

The control device 8 records information to a data storage device 532 corresponding to a developer replenishment container 5a and refers to information stored in the data storage device 532, via a first tag access device 71. Similarly, the control device 8 records information to the data storage device 532 corresponding to the developer collection container 5b and refers to information stored in the data storage device 532, via the second tag access device 72.

As shown in FIG. 2, the control device 8 includes a state detecting portion 81, a history managing portion 82, a drive control portion 83, and a UI (User Interface) control portion 84. In addition, the control device 8 can access a secondary storage device 800.

The secondary storage device 800 is a nonvolatile storage device configured to store various types of data that are referred to by the control device 8. The control device 8 can read and write data from/to the secondary storage device 800. It is noted that the secondary storage device 800 is an example of the computer-readable nonvolatile storage device.

The control device 8 may include a MPU (Micro Processor Unit) and a RAM (Random Access Memory), wherein the MPU executes programs stored in the secondary storage device 800. The RAM is a volatile main storage that temporarily stores programs to be executed by the MPU.

It is noted that the control device 8 may be composed of another type of processor such as a DSP (Digital Signal Processor), or a circuit such as an ASIC (Application Specific Integrated Circuit).

The state detecting portion 81 detects various types of state of the image forming apparatus 10, based on detection results of various types of sensors including the toner residual amount sensors 70. The history managing portion 82 manages the history of the state of the image forming apparatus 10, such as the history of the detection results of the state detecting portion 81.

The history managing portion 82 accesses the data storage devices 532 of the electronic tags 53 of the developer containers 5 via the first tag access devices 71 and the second tag access device 72, and records and refers to the history information. Furthermore, the history managing portion 82 executes a read process of reading data from the secondary storage device 800 and a write process of writing data to the secondary storage device 800.

The drive control portion 83 controls the operation of an image creation system motor 6 included in the image creating device 40. The image creation system motor 6 drives the photoconductor 41, the developing device 43, the developer replenishing mechanism, and the developer collecting mechanism in the image creating device 40. The UI control portion 84 controls the operation/display device 80.

[Developer Container Replacement Control]

Next, an example of the procedure of the developer container replacement control executed by the control device 8 is described with reference to the flowchart shown in FIG. 4. In the following description, S101, S102, . . . are identification signs representing the steps executed by the control device 8.

The control device 8 executes the developer container replacement control, for example, when the image forming apparatus 10 has been started, before an image formation job is executed, after an image formation job is executed, and when a cover that accesses any of the first attachment portions 51 or the second attachment portion 52 has been closed.

<Step S101>

In the developer container replacement control, the state detecting portion 81 determines whether or not any of the toner residual amount sensors 70 has detected a replenishment empty state with respect to each of the plurality of first attachment portions 51. The state detecting portion 81 continues to execute the process of step S101 until the replenishment empty state is detected in one or more first attachment portions 51.

<Step S102>

Upon detection of the replenishment empty state, the drive control portion 83 sets an image creation prohibition flag to "ON". The image creation prohibition flag indicates whether or not to prohibit the operation of the image creating device 40 including the image creation system motor 6.

When an image formation job is entered during a stop of the image creating device 40, the drive control portion 83 allows the image creating device 40 to be activated on condition that the image creation prohibition flag is "OFF". In addition, when the image creation prohibition flag changes from "OFF" to "ON" during operation of the image creating device 40, the drive control portion 83 stops the image creating device 40.

Prohibiting the operation of the image creating device 40 is a typical example of restricting the operation of the image creating device 40. The initial state of the image creation prohibition flag is "OFF". The drive control portion 83 is an example of the image creation restricting portion.

<Step S103>

Upon detection of the replenishment empty state, a replenishment empty history recording portion 82*a* of the history managing portion 82 records replenishment empty history information D1 to the data storage device 532 of the replenishment container tag 53*a* fixed to a developer replenishment container 5*a* in which the replenishment empty state was detected.

In the present embodiment, with the configuration where the electronic tag 53 is fixed to each of the developer containers 5, each of the developer replenishment containers 5*a* is associated with the replenishment empty history information D1 stored in the data storage device 532.

The replenishment empty history information D1 indicates a history of its associated developer container 5 having been used as a developer replenishment container 5*a* until it became the replenishment empty state. It is noted that the data storage device 532 of the electronic tag 53 fixed to the developer container 5 is an example of the computer-readable nonvolatile history storage device.

<Step S104>

Upon recording of the replenishment empty history information D1, the control device 8 executes a container attachment/detachment confirmation process that is described below. In the container attachment/detachment confirmation process, it is confirmed that both the developer collection container 5*b* and a developer replenishment container 5*a* in the replenishment empty state were detached from the main body 1, and a detached developer container 5 was attached to the second attachment portion 52 as a developer collection container 5*b*.

<Step S105>

Upon confirming that the developer collection container 5*b* was attached to the second attachment portion 52, the history managing portion 82 executes a process of detecting a post-empty container attached state. In the present embodiment, in the post-empty container attached state, a developer container 5 to which an electronic tag 53 whose data storage device 532 stores the replenishment empty history information D1 is fixed, is attached to the second attachment portion 52.

That is, if it can obtain the replenishment empty history information D1 from the data storage device 532 of the electronic tag 53 via the second tag access device 72, the state detecting portion 81 detects that the second tag access device 72 is in the post-empty container attached state.

The process of step S105 is executed by a post-empty attachment detecting portion 81*a* of the state detecting portion 81 when the replenishment empty state is detected.

It is noted that in the present embodiment, the post-empty container attached state is an example of the state where the developer container 5 corresponding to the replenishment empty history information D1 recorded in a nonvolatile storage device is attached to the second attachment portion 52.

<Step S106>

When the post-empty container attached state is detected, the control device 8 executes a new container attachment confirmation process that is described below. In the new container attachment confirmation process, it is confirmed that a new developer replenishment container 5a has been attached to a first attachment portion 51 from which a developer replenishment container 5a was datached.

<Step S107>

When a new developer replenishment container 5a is attached to the first attachment portion 51, the drive control portion 83 sets the image creation prohibition flag to "OFF". This allows the drive control portion 83 to operate the image creating device 40. With the completion of the process of step S107, the developer container replacement control ends.

<Step S108>

On the other hand, when the post-empty container attached state has not been detected in step S105, the UI control portion 84 determines whether or not a predetermined restriction releasing operation has been performed on the operation device 80a. The restriction releasing operation is an operation performed by the user to forcibly release a restriction on the operation of the image creating device 40.

Upon determining that the restriction releasing operation has not been performed on the operation device 80a, the UI control portion 84 moves the process to step S105. With this configuration, the image creation prohibition flag is maintained to be "ON" until the state detecting portion 81 detects the post-empty container attached state, or the restriction releasing operation is performed on the operation device 80a. The drive control portion 83 maintains the image creating device 40 to be stopped while the image creation prohibition flag is maintained to be "ON".

On the other hand, upon determining that the restriction releasing operation has been performed on the operation device 80a, the UI control portion 84 moves the process to step S109.

<Step S109>

When the restriction releasing operation has been performed on the operation device 80a in a state where the post-empty container attached state had not been detected, the history managing portion 82 records restriction release history information D3 to the secondary storage device 800. The process of step S109 is executed by a restriction release recording portion 82d of the history managing portion 82.

The restriction release history information D3 indicates as a history that the restriction releasing operation was performed on the operation device 80a in a state where the post-empty container attached state had not been detected. The secondary storage device 800 is an example of the computer-readable nonvolatile restriction release storage device.

<Step S110>

The UI control portion 84 outputs a predetermined warning message to the display device 80b. For example, the warning message may indicate that a replacement of the developer collection container 5b was not performed correctly. Thereafter, if the restriction release history information D3 is stored in the secondary storage device 800, the UI control portion 84 outputs the warning message to the display device 80b at least when the image creating device 40 is activated.

The process of step S110 is executed by a warning output portion 84b of the UI control portion 84. The process of step S110 is an example of the process in which, when the restriction release history information D3 is recorded in the secondary storage device 800, a warning is output via the display device 80b.

The UI control portion 84 moves the process from step S110 to step S106. It is then confirmed that a new developer container 5 has been attached to a first attachment portion 51 (S106). Subsequently, the image creation prohibition flag is set to "OFF" (S107). With the completion of the process of step S107, the developer container replacement control ends.

As described above, when the replenishment empty state is detected, the drive control portion 83 restricts the operation of the image creating device 40 (S102), and when the post-empty container attached state is detected, the drive control portion 83 releases the restriction on the operation of the image creating device 40 (S107). The drive control portion 83 is an example of the image creation restricting portion.

In the present embodiment, when the replenishment empty state is detected, the drive control portion 83 also maintains the image creating device 40 to be stopped until either of the following two states is detected. One of the two states is the post-empty container attached state. The other is a state where the restriction releasing operation has been performed on the operation device 80a. It is noted that, upon detection of either of the two states, the drive control portion 83 releases the restriction on the operation of the image creating device 40.

[Container Attachment/Detachment Confirmation Process (S104)]

Figure 5:
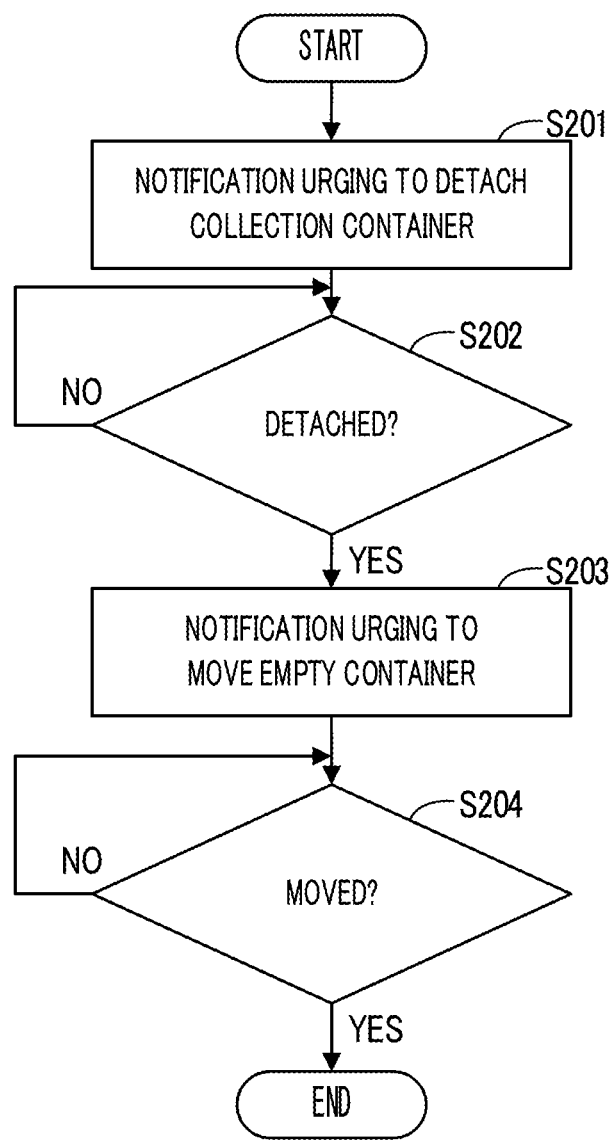
FIG. 5 is a flowchart showing an example of a procedure of a container attachment/detachment confirmation process in the image forming apparatus according to the first embodiment.

Next, an example of the procedure of the container attachment/detachment confirmation process executed by the control device 8 is described with reference to the flowchart shown in FIG. 5. As described above, the container attachment/detachment confirmation process is executed when the replenishment empty state is detected. In the following description, S201, S202, ... are identification signs representing the steps executed by the control device 8 in the container attachment/detachment confirmation process.

<Step S201>

First, a container replacement notifying portion 84a of the UI control portion 84 outputs, via the display device 80b, a notification message urging to detach the developer collection container 5b from the second attachment portion 52.

<Step S202>

Next, a container detecting portion 81c of the state detecting portion 81 determines whether or not the developer collection container 5b has been detached from the second attachment portion 52.

For example, when it cannot communicate with the collection container tag 53b via the second tag access device 72, the container detecting portion 81c determines that the developer collection container 5b has been detached from the second attachment portion 52.

The container detecting portion 81c repeats the process of step S202 until it confirms that the developer collection container 5b has been detached from the second attachment portion 52.

<Step S203>

When it is determined that the developer collection container 5b has been detached from the second attachment portion 52, a container replacement notifying portion 84a of the UI control portion 84 outputs, via the display device 80b, a notification urging to move the developer replenishment container 5a in which the replenishment empty state was detected, from the first attachment portion 51 to the second attachment portion 52.

The notification output in step S203 urges to detach the developer replenishment container 5a in which the replenishment empty state was detected, from the first attachment portions 51, and attach the detached developer replenishment container 5a to the second attachment portion 52 as the developer collection container 5b.

<Step S204>

Next, the container detecting portion 81c of the state detecting portion 81 determines whether or not the developer replenishment container 5a in which the replenishment empty state was detected, was detached from the first attachment portions 51 and attached to the second attachment portion 52.

For example, when it cannot communicate, via the first tag access device 71, with the replenishment container tag 53a of the developer replenishment container 5a in which the replenishment empty state was detected, the container detecting portion 81c determines that the developer replenishment container 5a in the replenishment empty state was detached. Furthermore, when it can communicate with the collection container tag 53b via the second tag access device 72, the container detecting portion 81c determines that the developer container 5 was attached to the second attachment portion 52.

The container detecting portion 81c repeats the process of step S204 until it confirms that the developer replenishment container 5a in the replenishment empty state was detached and the developer container 5 was attached to the second attachment portion 52.

The container detecting portion 81c ends the container attachment/detachment confirmation process when it confirms that the developer replenishment container 5a in the replenishment empty state was detached and the developer container 5 was attached to the second attachment portion 52.

As described above, when the replenishment empty state is detected, the container replacement notifying portion 84a outputs, via the display device 80b, a notification urging to detach the developer collection container 5b from the second attachment portion 52 (S201). Subsequently, the container replacement notifying portion 84a outputs a notification that urges to detach the developer replenishment container 5a in which the replenishment empty state was detected, from the first attachment portions 51, and attach it to the second attachment portion 52 (S203).

This enables the user to replace the developer containers 5 efficiently by working in accordance with the notifications output in the above-stated order. It is noted that the processes of steps S201 and S203 are an example of the process of outputting, via the display device 80b, a notification that urges to replace the developer collection container 5b of the second attachment portion 52.

[New Container Attachment Confirmation Process (S106)]

Next, an example of the procedure of the new container attachment confirmation process executed by the control device 8 is described with reference to the flowchart shown in FIG. 6. As described above, the new container attachment confirmation process is executed when the post-empty container attached state is detected. In the following description, S301, S302, . . . are identification signs representing the steps executed by the control device 8 in the new container attachment confirmation process.

<Step S301>

First, the container replacement notifying portion 84a of the UI control portion 84 outputs, via the display device 80b, a notification message that urges to attach a new developer container 5 to an empty first attachment portion 51 from which the developer replenishment container 5a was detached.

<Step S302>

Next, the container detecting portion 81c of the state detecting portion 81 determines whether or not a developer container 5 has been attached to the empty first attachment portion 51.

For example, the container detecting portion 81c determines that a developer container 5 has been attached to the empty first attachment portion 51 when it has become able to communicate with the replenishment container tag 53a of the first attachment portion 51 via a first tag access device 71, whereas the communication was not available before.

The container detecting portion 81c repeats the process of step S302 until it confirms that a developer container 5 has been attached to the empty first attachment portion 51.

<Step S303>

Upon confirming that a developer container 5 has been attached to the empty first attachment portion 51, the state detecting portion 81 detects whether or not the first attachment portion 51 is in a post-collection-use container attached state.

In the present embodiment, the post-collection-use container attached state refers to a state where a developer container 5 to which an electronic tag 53 whose data storage device 532 stores post-collection-use history information D2 is fixed, is attached to a first attachment portion 51.

In other words, in step S303, the state detecting portion 81 detects whether or not the developer container 5 corresponding to post-collection-use history information D2 stored in the data storage device 532 of the electronic tag 53, is attached to a first attachment portion 51. The process of step S303 is executed by a post-collection-use attachment detecting portion 81b of the state detecting portion 81.

As described below, the post-collection-use history information D2 is recorded in the data storage device 532 of the collection container tag 53b when the image creating device 40 is activated. The post-collection-use history information D2 indicates that its associated developer container 5 had been used as the developer collection container 5b in the past.

In a case where it is determined in step S303 that the first attachment portion 51 is not in the post-collection-use container attached state, it is considered that a new developer replenishment container 5a has been attached to the first attachment portion 51. In this case, the state detecting portion 81 ends the new container attachment confirmation process. As a result, the image creation prohibition flag is set to "OFF" (S107).

On the other hand, in a case where it is determined in step S303 that the first attachment portion 51 is in the post-collection-use container attached state, the state detecting portion 81 moves the process to step S304.

<Step S304>

When the first attachment portion 51 is in the post-collection-use container attached state, an error notification portion 84c of the UI control portion 84 outputs, via the display device 80b, an error notification indicating that the developer container 5 attached to the first attachment portion 51 is an improper container. For example, this error notification may be a message indicating that the developer container 5 attached to the first attachment portion 51 had been used as the developer collection container 5b.

After outputting the error notification, the error notification portion 84c moves the process to step S301. With this configuration, the process of step S107 shown in FIG. 4 is executed only after it is determined that the first attachment portion 51 is not in the post-collection-use container attached state, and until then, the image creation prohibition flag is maintained to be "ON".

Accordingly, the drive control portion 83 restricts the operation of the image creating device 40 while the first attachment portion 51 is in the post-collection-use container attached state. This prevents the waste developer 90*b* from being supplied to the developing device 43, and prevents the image creating device 40 from being contaminated by the waste developer 90*b*.

[History Management Process]

Next, an example of the procedure of the history management process executed by the control device 8 is described with reference to the flowchart shown in FIG. 7. The history management process is executed when the image creating device 40 is activated. In the following description, S401, S402, . . . are identification signs representing the steps executed by the control device 8 in the history management process.

<Step S401>

When the image creating device 40 is activated, the history managing portion 82 invalidates the replenishment empty history information D1 stored in the data storage device 532 of the collection container tag 53*b*.

The process of step S401 is executed by a replenishment empty history invalidating portion 82*b* of the history managing portion 82. For example, the replenishment empty history invalidating portion 82*b* invalidates the replenishment empty history information D1 by deleting the replenishment empty history information D1 from the data storage device 532 of the collection container tag 53*b*.

Alternatively, the replenishment empty history invalidating portion 82*b* may invalidate the replenishment empty history information D1 by recording a predetermined invalidation flag information to the data storage device 532 of the collection container tag 53*b*.

Figure 4:
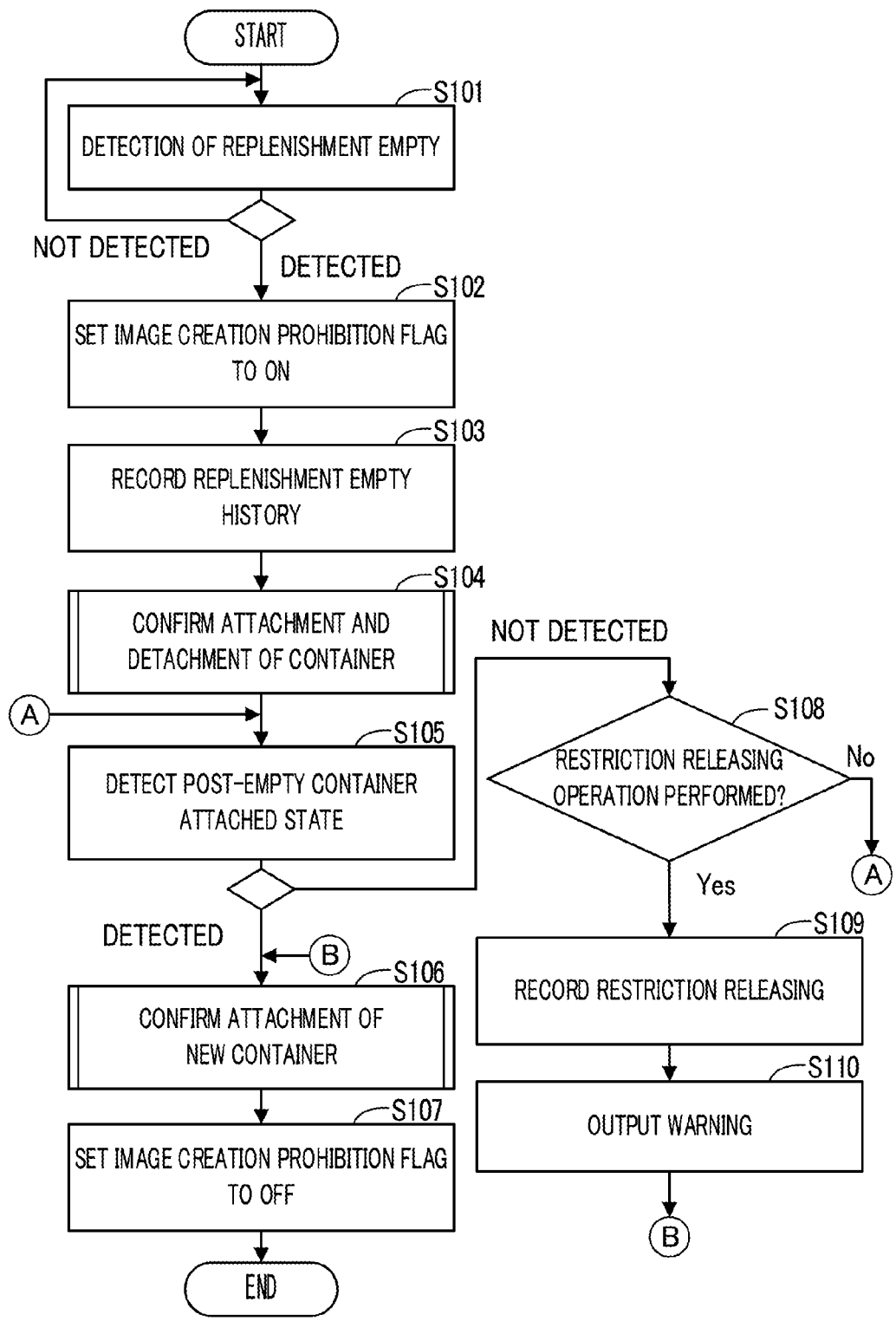
FIG. 4 is a flowchart showing an example of a procedure of a developer container replacement control in the image forming apparatus according to the first embodiment.

It is noted that in step S105 shown in FIG. 4, the post-empty attachment detecting portion 81*a* of the state detecting portion 81 detects, as the post-empty container attached state, a state where a developer container 5 corresponding to a collection container tag 53*b* whose data storage device 532 stores valid replenishment empty history information D1, is attached.

That is, the post-empty attachment detecting portion 81*a* detects that the second attachment portion 52 is in the post-empty container attached state, when the developer container 5 corresponding to a valid replenishment empty history information D1 recorded in the data storage device 532, is attached to the second attachment portion 52.

In the image forming apparatus 10, the following case may occur. That is, a developer collection container 5*b* having collected a large amount of waste developer 90*b* may be detached from the second attachment portion 52, and attached to the second attachment portion 52 again. Even if such a case occur, with the execution of the process of step S401, the post-collection-use container attached state is not detected in step S105. As a result, this configuration prevents an overflow of the waste developer 90*b* of the developer collection container 5*b* due to re-use of the developer collection container 5*b* that has collected a large amount of waste developer 90*b* therein.

<Step S402>

Furthermore, the history managing portion 82 records the post-collection-use history information D2 to the data storage device 532 of the collection container tag 53*b* when the image creating device 40 is activated.

The process of step S402 is executed by a collection use history recording portion 82*c* of the history managing portion 82. The process of step S402 is an example of the process in which the post-collection-use history information D2 is recorded to the data storage device 532 as the history storage device, in correspondence with the developer container 5 attached to the second attachment portion 52.

<Step S403>

Furthermore, the restriction release recording portion 82*d* of the history managing portion 82 determines whether or not the restriction release history information D3 is stored in the secondary storage device 800.

When the restriction release history information D3 is not stored in the secondary storage device 800, the restriction release recording portion 82*d* ends the history management process. When the restriction release history information D3 is stored in the secondary storage device 800, the restriction release recording portion 82*d* moves the process to step S404.

<Step S404>

In step S404, as in step S110, the warning output portion 84*b* of the UI control portion 84 outputs a warning message to the display device 80*b*. Thereafter, the warning output portion 84*b* ends the history management process.

The process of step S404 is an example of the process in which, when the restriction release history information D3 is recorded in the secondary storage device 800, a warning is output via the display device 80*b*.

In the image forming apparatus 10, each time the replenishment empty state is detected, the control device 8 restricts the operation of the image creating device 40 until the developer collection container 5*b* is replaced with a developer replenishment container 5*a* in which the replenishment empty state was detected.

In general, if the developer collection container 5*b* is replaced with a developer replenishment container 5*a* in the replenishment empty state each time the replenishment empty state is detected, the developer collection container 5*b* never becomes full.

In addition, for the user, performing the replacement of the developer replenishment containers 5*a* in the replenishment empty state and the replacement of the developer collection container 5*b* hardly increase the load of the user.

As a result, with the adoption of the image forming apparatus 10, it is possible to urge a replacement of the developer collection container 5*b* to the user at a proper timing while preventing the replenishment developer 90*a* in the developer replenishment containers 5*a* from being wastefully discharged, without a sensor for detecting the amount of the waste developer 90*b* in the developer collection container 5*b*.

In addition, in the image forming apparatus 10, the replenishment empty history information D1 and the post-collection-use history information D2 are recorded in the data storage device 532 of the electronic tag 53 that is integrally provided with the developer container 5.

Accordingly, a developer container 5 that had been used as a developer replenishment container 5*a* in an image forming apparatus 10 can be used as the developer collection container 5*b* in another image forming apparatus 10. Furthermore, a developer container 5 that had been used as the developer collection container 5*b* in an image forming apparatus 10 cannot be used as a developer replenishment containers 5*a* even in another image forming apparatus 10.

In addition, in the image forming apparatus 10, in a case where the restriction release history information D3 indicating a history of performance of the restriction releasing operation is recorded, the warning message is output (S404). In a case where an apparatus malfunction has occurred, the warning message helps to specify the cause of the malfunction.

Second Embodiment

Next, a description is given of an image forming apparatus 10A according to a second embodiment of the present disclosure and an image forming system 100 including the image forming apparatus 10A, with reference to FIG. 8 to FIG. 12.

Figure 8:
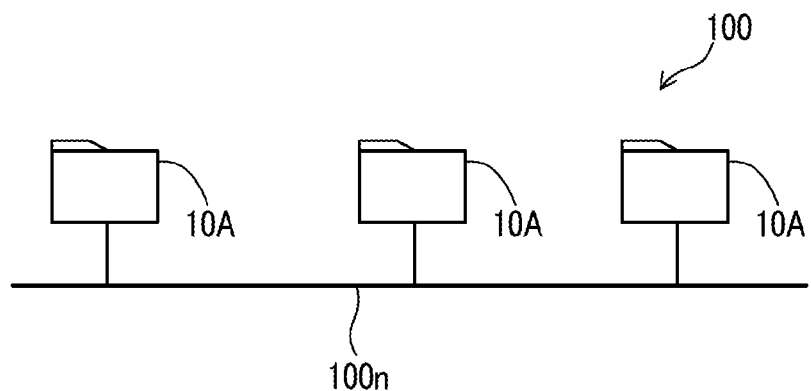
FIG. 8 is a configuration diagram of an image forming system including an image forming apparatus according to a second embodiment of the present disclosure.

As shown in FIG. 8, the image forming system 100 includes a plurality of image forming apparatuses 10A that can perform communications via a network 100n. The network 100n is, for example, a local area network.

Figure 9:
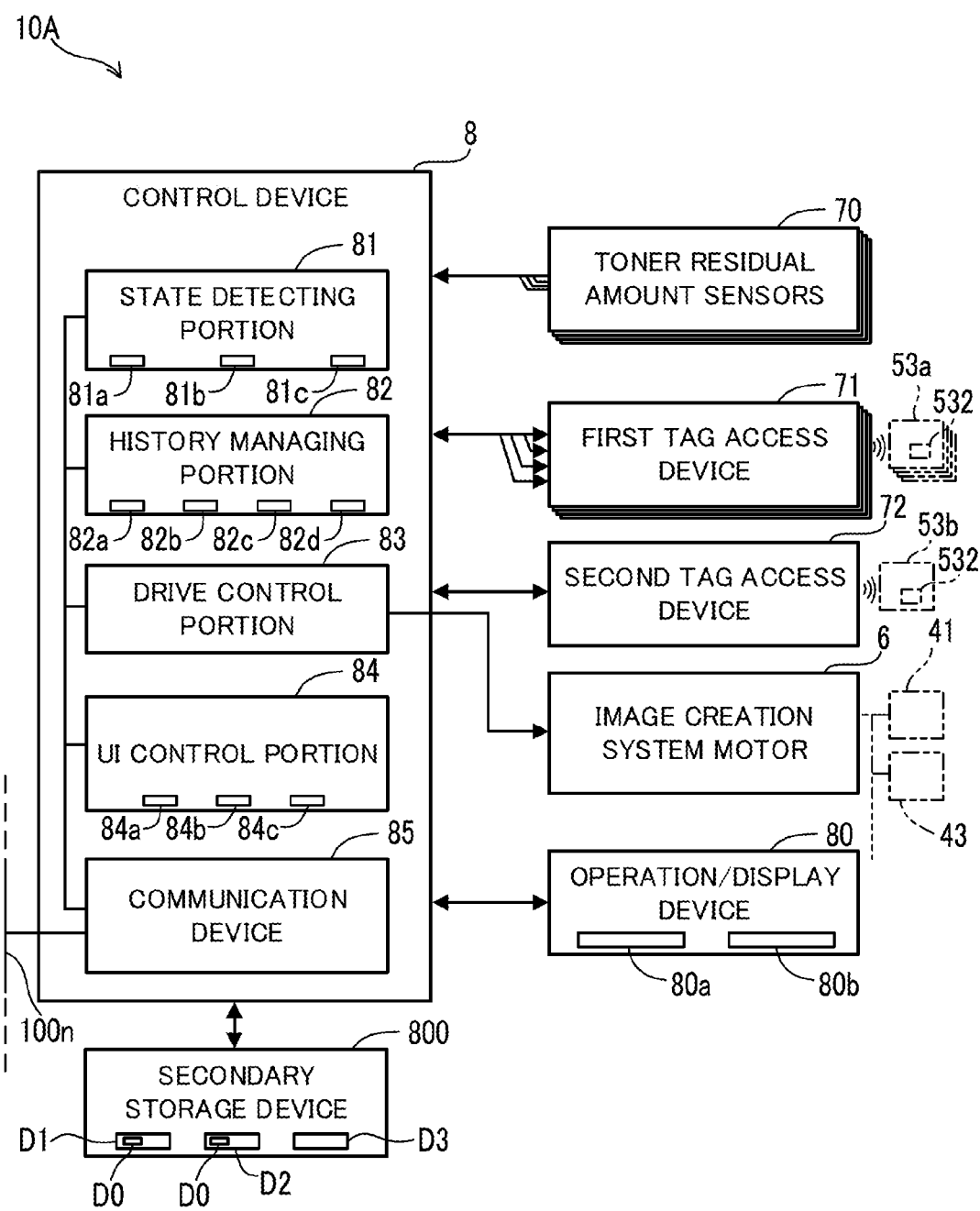
FIG. 9 is a block diagram of control-related portions in the image forming apparatus according to the second embodiment.

As shown in FIG. 9, the image forming apparatus 10A includes a communication device 85 in addition to the configuration of the image forming apparatus 10. The communication device 85 is a communication interface that can communicate with another image forming apparatus 10A via the network 100n. It is noted that in the present embodiment, the communication device 85 constitutes a part of the control device 8.

Figure 10:
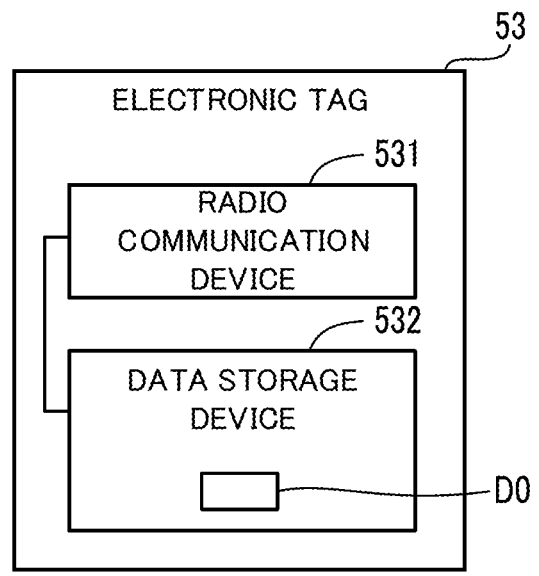
FIG. 10 is a block diagram of an electronic tag in the image forming apparatus according to the second embodiment.

As shown in FIG. 10, a first difference of the image forming apparatus 10A from the image forming apparatus 10 is that a container identification information D0 is stored in advance in a data storage device 532 of an electronic tag 53 fixed to a developer container 5, wherein the container identification information D0 identifies the developer container 5 to which its associated electronic tag 53 is fixed.

In addition, a second difference of the image forming apparatus 10A from the image forming apparatus 10 is that the first tag access devices 71 and the second tag access device 72 are interfaces dedicated to the read process. The first tag access devices 71 and the second tag access device 72 read the container identification information D0 from the data storage device 532 of the electronic tag 53.

In addition, a third difference of the image forming apparatus 10A from the image forming apparatus 10 is that the replenishment empty history information D1 and the post-collection-use history information D2 are recorded to the secondary storage device 800 of the image forming apparatus 10A, and the replenishment empty history information D1 and the post-collection-use history information D2 are associated with the developer container 5 by the container identification information D0 (see FIG. 9). The secondary storage device 800 of the present embodiment is an example of the history storage device provided in the main body 1 of the image forming apparatus 10A.

A fourth difference of the image forming apparatus 10A from the image forming apparatus 10 is that it has a function to communicate with another image forming apparatus 10A via the communication device 85 such that the image forming apparatus 10A and another image forming apparatus 10A can mutually confirm the recording state of the replenishment empty history information D1 and the post-collection-use history information D2 in the secondary storage device 800.

Figure 7:
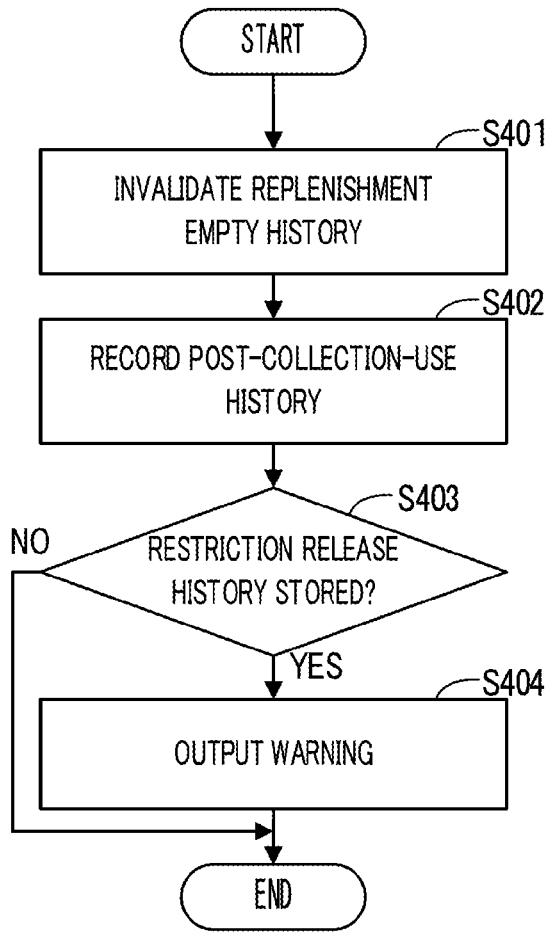
FIG. 7 is a flowchart showing an example of a procedure of a history management process in the image forming apparatus according to the first embodiment.
Figure 11:
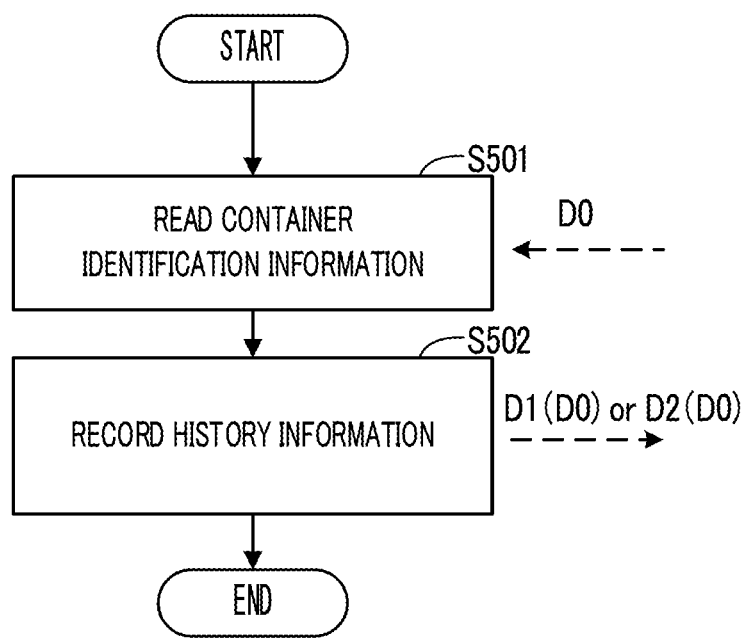
FIG. 11 is a flowchart showing an example of a procedure of a history information recording process in the image forming apparatus according to the second embodiment.

In step S103 of FIG. 4 and step S402 of FIG. 7, the control device 8 of the image forming apparatus 10A executes a history information recording process shown in FIG. 11, and thereby records the replenishment empty history information D1 and the post-collection-use history information D2 to the secondary storage device 800. The history information recording process corresponds to the first to third differences.

[History Information Recording Process]

In the flowchart shown in FIGS. 11, S501 and S502 are identification signs representing the steps executed by the control device 8 in the history information recording process.

<Step S501>

In the history information recording process, first, the history managing portion 82 reads container identification information D0 stored in the data storage device 532 of the electronic tag 53, via a first tag access device 71 or the second tag access device 72.

<Step S502>

Next, the history managing portion 82 records the replenishment empty history information D1 or the post-collection-use history information D2 that includes the container identification information D0 read from the electronic tag 53, to the secondary storage device 800. After the completion of step S502, the history managing portion 82 ends the history information recording process.

It is noted that a process of referring to and recording the replenishment empty history information D1 in steps S501 and S502 corresponding to step S103 is executed by the replenishment empty history recording portion 82a of the history managing portion 82. In addition, a process of referring to and recording the post-collection-use history information D2 in steps S501 and S502 corresponding to step S402 is executed by the collection use history recording portion 82c of the history managing portion 82.

The data storage device 532 that is an information recording medium of the electronic tag 53 in the present embodiment is an example of the identification information recording medium which is fixed to the developer containers 5 and in which the container identification information D0 is recorded in advance.

The first tag access devices 71 of the present embodiment are an example of the first identification information reading device that reads the container identification information D0 from the data storage device 532 of a developer container 5 attached to a first attachment portion 51. Similarly, the second tag access device 72 of the present embodiment are an example of the second identification information reading device that reads the container identification information D0 from the data storage device 532 of a developer container 5 attached to the second attachment portion 52.

Figure 6:
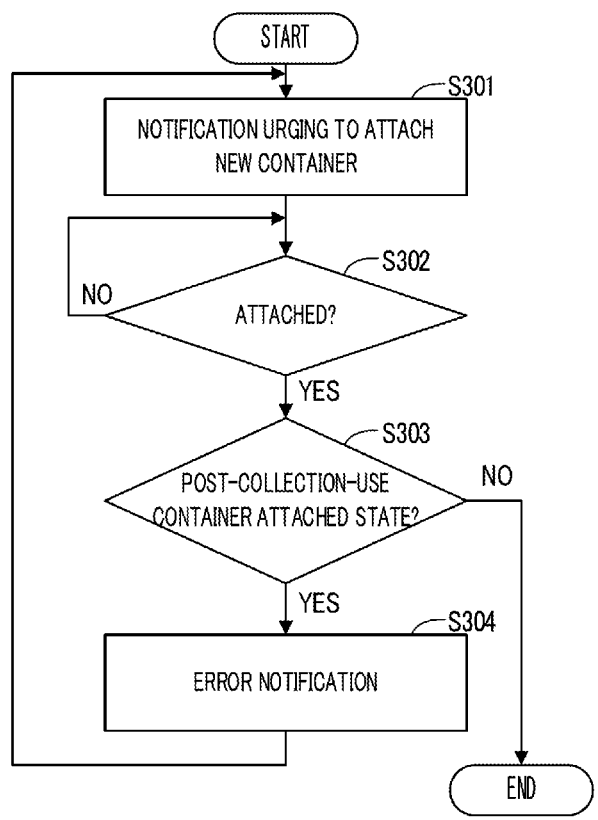
FIG. 6 is a flowchart showing an example of a procedure of a new container attachment confirmation process in the image forming apparatus according to the first embodiment.
Figure 12:
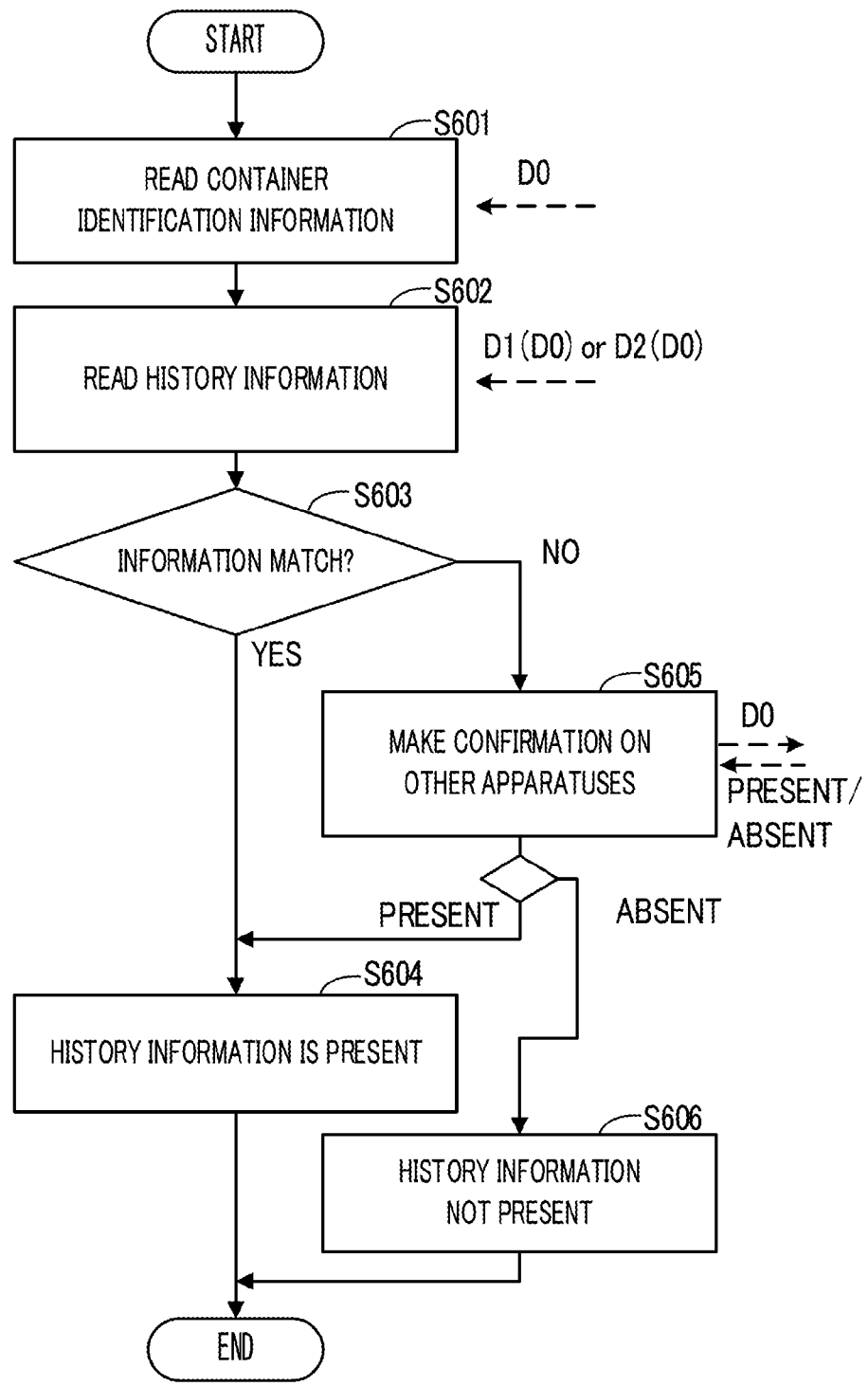
FIG. 12 is a flowchart showing an example of a procedure of a history information confirming process in the image forming apparatus according to the second embodiment.

In addition, the control device 8 of the image forming apparatus 10A executes, in step S105 of FIG. 4 and step S303 of FIG. 6, a history information confirming process shown in FIG. 12.

In the history information confirming process, it is determined whether or not replenishment empty history information D1 corresponding to a developer container 5 attached to the second attachment portion 52 and post-collection-use history information D2 corresponding to a developer container 5 attached to a first attachment portion 51 are present in the secondary storage devices 800 of its associated apparatus and another apparatus. The history information confirming process corresponds to the fourth difference of the image forming apparatus 10A from the image forming apparatus 10.

[History Information Confirming Process]

In the flowchart shown in FIG. 12, S601, S602 . . . are identification signs representing the steps executed by the control device 8 in the history information confirming process.

<Step S601>

In the history information confirming process, first, the state detecting portion 81 reads container identification information D0 stored in the data storage device 532 of the electronic tag 53, via a first tag access device 71 or the second tag access device 72.

<Step S602>

Next, the state detecting portion 81 reads the replenishment empty history information D1 or the post-collection-use history information D2 from the secondary storage device 800 of its associated apparatus.

<Step S603>

Next, the state detecting portion 81 determines whether or not replenishment empty history information D1 or post-collection-use history information D2 that includes container identification information D0 that matches information obtained from the electronic tag 53 via the second tag access device 72 or a first tag access device 71, has been obtained from the secondary storage device 800.

Upon determining that replenishment empty history information D1 or post-collection-use history information D2 that includes container identification information D0 that matches information obtained from the electronic tag 53, has been obtained from the secondary storage device 800, the state detecting portion 81 moves the process to step S604.

On the other hand, upon determining that replenishment empty history information D1 or post-collection-use history information D2 that includes container identification information D0 that matches information obtained from the electronic tag 53, has not been obtained from the secondary storage device 800, the state detecting portion 81 moves the process to step S605.

<Step S604>

In step S604, the state detecting portion 81 determines that replenishment empty history information D1 corresponding to the developer container 5 of the second attachment portion 52 or post-collection-use history information D2 corresponding to the developer container 5 of the first attachment portion 51 is present.

<Step S605>

On the other hand, in step S605, the state detecting portion 81 executes an other apparatus confirmation process on other image forming apparatuses 10A by performing a communication with the other image forming apparatuses 10A via the communication device 85.

In the other apparatus confirmation process, it is confirmed whether or not replenishment empty history information D1 or post-collection-use history information D2 that includes container identification information D0 that matches information obtained from the electronic tag 53 via the second tag access device 72 or a first tag access device 71, is present in the secondary storage device 800 of another image forming apparatus 10A.

For example, the state detecting portion 81 transmits, via the communication device 85, a history confirmation request including the container identification information D0 and history type information to all the other image forming apparatuses 10A in the network 100n. The history type information specifies either the replenishment empty history information D1 or the post-collection-use history information D2.

Upon receiving the history confirmation request, each of the other image forming apparatuses 10A determines whether or not the received container identification information D0 is present in the replenishment empty history information D1 or the post-collection-use history information D2 corresponding to the history type information in the secondary storage device 800 of its associated apparatus. Furthermore, each of the other image forming apparatuses 10A returns a determination result to the transmission source of the history confirmation request.

Upon receiving, from another image forming apparatus 10A, a response indicating that replenishment empty history information D1 or post-collection-use history information D2 that includes container identification information D0 that matches information obtained from the electronic tag 53, is present in the secondary storage device 800 thereof, the state detecting portion 81 moves the process to the step S604.

On the other hand, upon receiving, from another image forming apparatus 10A, a response indicating that replenishment empty history information D1 or post-collection-use history information D2 that includes container identification information D0 that matches information obtained from the electronic tag 53, is not present in the secondary storage device 800 thereof, the state detecting portion 81 moves the process to step S606.

<Step S606>

In step S606, the state detecting portion 81 determines that replenishment empty history information D1 corresponding to the developer container 5 of the second attachment portion 52 or post-collection-use history information D2 corresponding to the developer container 5 of the first attachment portion 51 is not present.

With the completion of the process of step S604 or S606, the state detecting portion 81 ends the history information confirming process.

When the state detecting portion 81 executes the process of step S604, the state detecting portion 81 detects the post-empty container attached state of the history managing portion 82, or the post-collection-use container attached state of the first attachment portion 51. In addition, when the state detecting portion 81 executes the process of step S606, the state detecting portion 81 does not detect any of the post-empty container attached state and the post-collection-use container attached state.

In other words, in steps S603, S604 corresponding to step S105, the post-empty attachment detecting portion 81a detects the post-empty container attached state when it can obtain, from the secondary storage device 800, the replenishment empty history information D1 including the container identification information D0 that matches information obtained via the second tag access device 72.

In addition, in steps S603, S604 corresponding to step S303, the post-collection-use attachment detecting portion 81b detects the post-collection-use container attached state when it can obtain, from the secondary storage device 800, the post-collection-use history information D2 including the container identification information D0 that matches information obtained via the first tag access device 71.

In the present embodiment, the replenishment empty history information D1 and the post-collection-use history information D2 associated with the container identification information D0 are recorded in the secondary storage device 800 of the image forming apparatus 10A. Furthermore, in a plurality of image forming apparatuses 10A, the replenishment empty history information D1 and the post-collection-use history information D2 stored in the secondary storage device 800 are used in common.

That is, the post-empty attachment detecting portion 81a of the image forming apparatus 10A, when it can confirm, through a communication with another apparatus via the communication device 85, that the replenishment empty history information D1 that includes the container identification information D0 that matches information obtained via the second tag access device 72 is present in the secondary storage device 800 of the other apparatus, detects the post-empty container attached state.

Similarly, the post-collection-use attachment detecting portion 81b of the image forming apparatus 10A, when it can confirm, through a communication with another apparatus via the communication device 85, that the post-collection-use history information D2 that includes the container identification information D0 that matches information obtained via the first tag access device 71 is present in the secondary storage device 800 of the other apparatus, detects the post-collection-use container attached state.

Accordingly, a developer container 5 that had been used as a developer replenishment container 5a in an image forming apparatus 10 can be used as the developer collection container 5b in another image forming apparatus 10. Furthermore, a developer container 5 that had been used as the developer collection container 5b in an image forming apparatus 10 cannot be used as a developer replenishment containers 5a even in another image forming apparatus 10.

APPLICATION EXAMPLES

In the image forming apparatus 10A, the recording medium which is fixed to the developer containers 5 and in which the container identification information D0 is recorded, may be an information recording medium other than the electronic tag 53, such as a sheet on which a QR Code™ or a bar code is drawn. In this case, the image forming apparatus 10A includes equipment, such as a camera, for reading the code recorded on the sheet, instead of the first tag access devices 71 and the second tag access device 72.

In addition, in the image forming apparatus 10A, the replenishment empty history information D1 and the post-collection-use history information D2 may be recorded in a nonvolatile storage device provided in another managing apparatus with which the image forming apparatus 10A can communicate via the communication device 85. In this case, the image forming apparatus 10A executes the other apparatus confirmation process (S605 of FIG. 12) on the managing apparatus.

Furthermore, the image forming apparatus 10 and the image forming apparatus 10A each may be a monochrome image forming apparatus that includes a first attachment portion 51, a second attachment portion 52, a developer replenishment container 5a, a developer collection container 5b, and a developing unit 4.

It is noted that the image forming apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
an image creating device including a developing device and an image carrying member configured to carry an image of developer that is supplied from the developing device;
a plurality of developer containers respectively configured to store the developer;
at least one first attachment portion which constitutes a part of the image forming apparatus and to which some of the plurality of developer containers that replenish the developer to the developing device, are attached in a detachable manner;
a second attachment portion which constitutes a part of the image forming apparatus and to which the others of the plurality of developer containers that are to store the developer collected from the image creating device, are attached in a detachable manner;
a display device;
a replenishment empty detection sensor configured to detect whether or not any of the developer containers attached to the first attachment portion is in a replenishment empty state where a residual amount of the developer therein is smaller than a predetermined lower limit amount; and
a processor configured to execute:
a replenishment empty history recording portion configured to, upon detection of the replenishment empty state, record replenishment empty history information to a computer-readable nonvolatile history storage device in correspondence with one of the plurality of developer containers in which the replenishment empty state was detected;
a post-empty attachment detecting portion configured to, upon detection of the replenishment empty state, detect whether or not the second attachment portion is in a post-empty container attached state where the developer container corresponding to the replenishment empty history information recorded in the history storage device is attached to the second attachment portion;
a container replacement notifying portion configured to, upon detection of the replenishment empty state, output, via the display device, a notification urging to replace the developer container attached to the second attachment portion; and
an image creation restricting portion configured to, upon detection of the replenishment empty state, restrict an operation of the image creating device, and upon detection that the second attachment portion is in the post-empty container attached state, release a restriction on the operation of the image creating device.

2. The image forming apparatus according to claim 1, wherein the processor is further configured to execute:
a replenishment empty history invalidating portion configured to, upon activation of the image creating device, invalidate the replenishment empty history information in the history storage device that corresponds to the developer container attached to the second attachment portion, and
the post-empty attachment detecting portion detects that the second attachment portion is in the post-empty container attached state when one of the plurality of developer containers corresponding to a valid piece of the replenishment empty history information recorded in the history storage device, is attached to the second attachment portion.

3. The image forming apparatus according to claim 2, wherein the processor is further configured to execute:
a collection use history recording portion configured to, upon activation of the image creating device, record post-collection-use history information to the history storage device in correspondence with the developer container attached to the second attachment portion; and a post-collection-use attachment detecting portion configured to detect whether or not the first attachment portion is in a post-collection-use container attached state where the developer container corresponding to the post-collection-use history information recorded in the history storage device, is attached to the first attachment portion, and the image creation restricting portion restricts the operation of the image creating device when the post-collection-use attachment detecting portion detects that the first attachment portion is in the post-collection-use container attached state.

4. The image forming apparatus according to claim 1, further comprising:

an electronic tag fixed to each of the developer containers and including the history storage device;

a first tag access device configured to access the electronic tag fixed to each of the developer containers attached to the first attachment portion; and a second tag access device configured to access the electronic tag fixed to the developer container attached to the second attachment portion, wherein the replenishment empty history recording portion records the replenishment empty history information to the history storage device of the electronic tag via the first tag access device, and the post-empty attachment detecting portion detects that the second attachment portion is in the post-empty container attached state when the replenishment empty history information has been obtained from the data storage device of the electronic tag via the second tag access device.

5. The image forming apparatus according to claim 1, further comprising:

an identification information recording medium which is fixed to each of the developer containers and in which container identification information identifying that developer container is recorded in advance;

a first identification information reading device configured to read the container identification information from the identification information recording medium fixed to each of the developer containers attached to the first attachment portion;

a second identification information reading device configured to read the container identification information from the identification information recording medium fixed to the developer container attached to the second attachment portion; and the history storage device provided in a main body of the image forming apparatus, wherein the replenishment empty history recording portion records, to the history storage device, the replenishment empty history information that includes the container identification information obtained from the identification information recording medium via the first identification information reading device, and the post-empty attachment detecting portion detects that the second attachment portion is in the post-empty container attached state in a case where the replenishment empty history information including the container identification information that matches information obtained via the second identification information reading device, has been obtained from the history storage device.

6. The image forming apparatus according to claim 5, further comprising:

a communication device configured to communicate with another apparatus that includes a history storage device, wherein the post-empty attachment detecting portion detects that the second attachment portion is in the post-empty container attached state also in a case where it has been confirmed, by a communication with the other apparatus via the communication device, that the replenishment empty history information including the container identification information that matches the information obtained via the second identification information reading device, is present in the history storage device of the other apparatus.

7. The image forming apparatus according to claim 1, further comprising:

an operation device configured to receive an operation, wherein the image creation restricting portion maintains the image creating device to be stopped until either it is detected that the second attachment portion is in the post-empty container attached state, or a predetermined restriction releasing operation is performed on the operation device, and the image creation restricting portion releases a restriction on the operation of the image creating device when it has been detected that the second attachment portion is in the post-empty container attached state, or when the restriction releasing operation has been performed on the operation device.

8. The image forming apparatus according to claim 7, wherein the processor is further configured to execute:

a restriction release recording portion configured to record restriction release history information to a computer-readable nonvolantary restriction release storage device when the restriction releasing operation has been performed on the operation device; and a warning output portion configured to output a warning via the display device when the restriction release history information has been recorded in the restriction release storage device.

9. The image forming apparatus according to claim 1, wherein upon detection of the replenishment empty state, the container replacement notifying portion outputs, via the display device, the notification urging to replace the developer container attached to the second attachment portion, then outputs a notification urging to detach the developer container in which the replenishment empty state was detected, from the first attachment portion and attach the detached developer container to the second attachment portion.

10. The image forming apparatus according to claim 1, wherein the at least one first attachment portion includes a plurality of first attachment portions to which a plurality of developer containers that have a same shape and store developer of different colors are attached.

* * * * *